United States Patent
Coldwate et al.

(10) Patent No.: US 9,912,214 B2
(45) Date of Patent: Mar. 6, 2018

(54) WIRE-WOUND STATOR HAVING PHASES WITH DIFFERENCE IN TEMPERATURE-RESPONSIVE ELECTRICAL RESISTANCE

(71) Applicant: Hamilton Sundstrand Corporation, Charlotte, NC (US)

(72) Inventors: Joseph Kenneth Coldwate, Roscoe, IL (US); Andreas C. Koenig, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 22 days.

(21) Appl. No.: 15/006,168

(22) Filed: Jan. 26, 2016

(65) Prior Publication Data
US 2017/0214298 A1 Jul. 27, 2017

(51) Int. Cl.
*H02K 3/28* (2006.01)
*H02K 11/25* (2016.01)
*H02P 29/00* (2016.01)

(52) U.S. Cl.
CPC ............... *H02K 11/25* (2016.01); *H02K 3/28* (2013.01); *H02P 29/0055* (2013.01)

(58) Field of Classification Search
USPC ....... 318/471, 472, 491, 494, 495, 496, 508, 318/509, 538, 558
See application file for complete search history.

(56) References Cited

U.S. PATENT DOCUMENTS

| | | | | | |
|---|---|---|---|---|---|
| 2,261,250 | A | * | 11/1941 | Haddad | H02K 17/04 310/172 |
| 3,324,371 | A | * | 6/1967 | Stauffer | H02K 17/10 318/774 |
| 3,774,062 | A | * | 11/1973 | Johnson | H02K 3/02 310/12.04 |
| 9,214,839 | B2 | * | 12/2015 | Fargo | H02K 3/02 |

* cited by examiner

*Primary Examiner* — Bentsu Ro
(74) *Attorney, Agent, or Firm* — Carlson, Gaskey & Olds, P.C.

(57) ABSTRACT

A machine includes a rotor and a stator that is situated adjacent the rotor. The stator includes a plurality of wire-wound phases. The phases include at least first and second wire-wound phases that differ in temperature-responsive electrical resistance. A controller is in electrical communication with the stator. The controller is configured to identify an over-temperature condition of the stator based upon the differing temperature-responsive electrical resistance and modify the operation of the stator in response to the over-temperature condition.

14 Claims, 2 Drawing Sheets

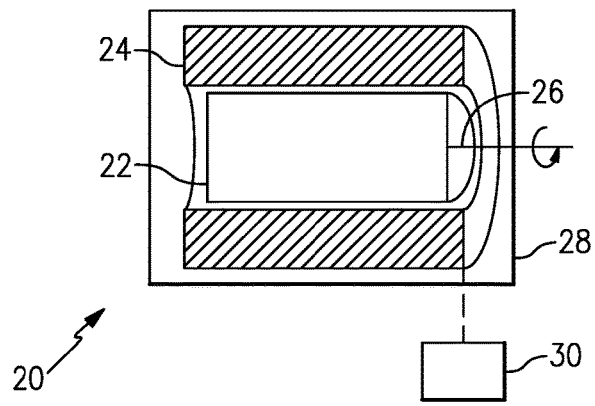
FIG.1
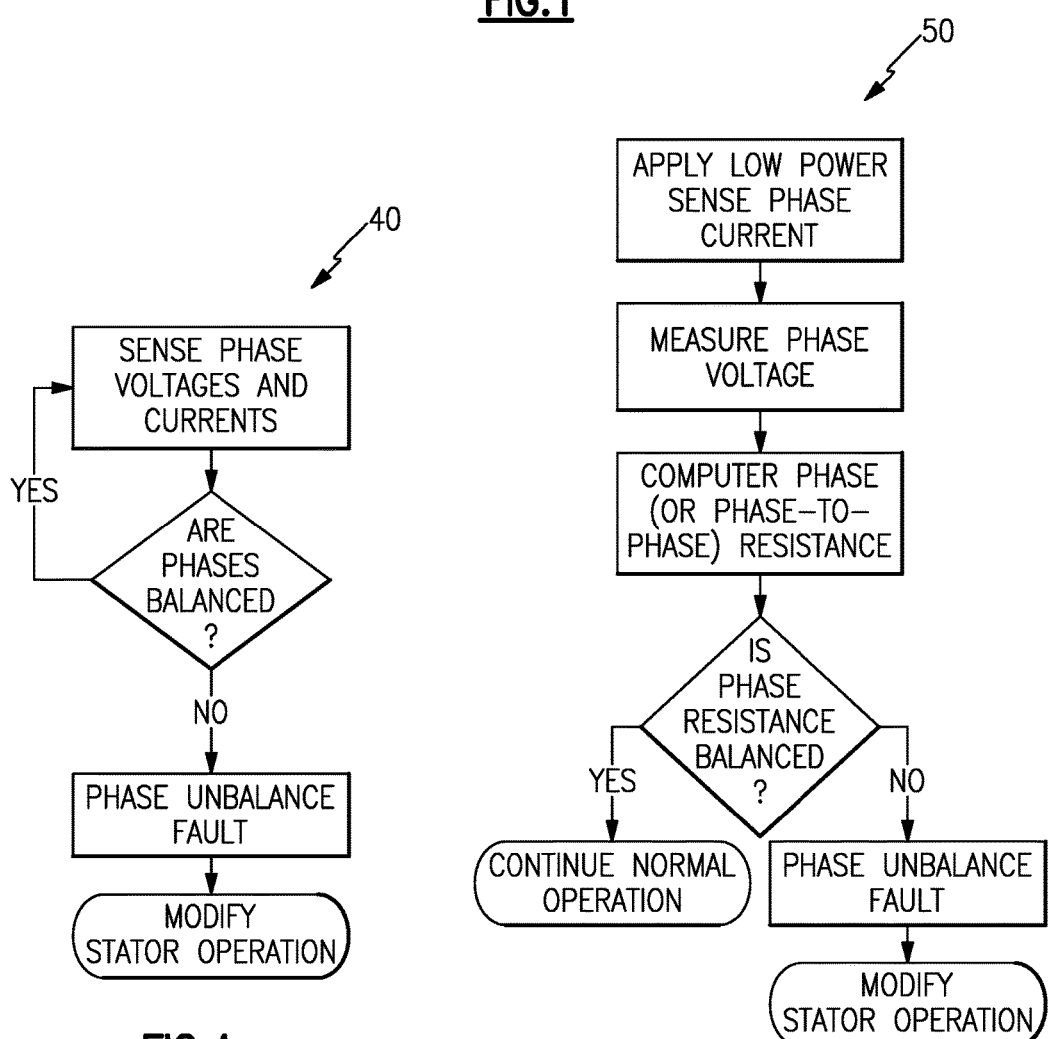
FIG.4
FIG.5

WIRE-WOUND STATOR HAVING PHASES WITH DIFFERENCE IN TEMPERATURE-RESPONSIVE ELECTRICAL RESISTANCE

BACKGROUND

Electric motors, generators, and other wire-wound rotary machines typically include a wire-wound stator. The stator, and possibly other components, may be temperature-sensitive. If the temperature exceeds a limit, the stator or other components of the machine may be damaged.

SUMMARY

A machine according to an example of the present disclosure includes a rotor and a stator situated adjacent the rotor. The stator includes a plurality of wire-wound phases. The plurality of wire-wound phases includes at least first and second wire-wound phases that differ in temperature-responsive electrical resistance, and a controller in electrical communication with the plurality of wire-wound phases. The controller is configured to identify an over-temperature condition of the stator based upon the differing temperature-responsive electrical resistance of the first and second wire-wound phases, and modify operation of the stator in response to the over-temperature condition.

In a further embodiment of any of the foregoing embodiments, the first wire-wound phase includes a conductive wire formed of a first material and the second wire-wound phase includes a conductive wire formed of a second material that differs in composition from the first material.

In a further embodiment of any of the foregoing embodiments, the first material and the second material are independently selected from the group consisting of allotropes of carbon, silver, copper, gold, aluminum, calcium, tungsten, zinc, nickel, lithium, iron, platinum, tin, and combinations thereof.

In a further embodiment of any of the foregoing embodiments, the first material includes copper and the second material excludes copper and includes at least one of allotropes of carbon, silver, gold, or aluminum.

In a further embodiment of any of the foregoing embodiments, the second wire-wound phase includes one or more wire bundles, and each of the one or more wire bundles includes the conductive wire formed of the second material.

In a further embodiment of any of the foregoing embodiments, the second wire-wound phase includes a plurality of wire bundles, and one of the wire bundles includes the conductive wire formed of the second material and another of the wire bundles includes a conductive wire formed of a third material that differs in composition from the second material.

In a further embodiment of any of the foregoing embodiments, the second wire-wound phase includes a plurality of wire bundles, and one of the wire bundles includes the conductive wire formed of the second material and another of the wire bundles includes a conductive wire formed of a third material having the same composition as the first material.

In a further embodiment of any of the foregoing embodiments, the controller is configured to identify the over-temperature condition based upon a difference in an electrical parameter between the first and second wire-wound phases that changes according to the temperature-responsive electrical resistance of the first and second wire-wound phases.

In a further embodiment of any of the foregoing embodiments, the controller is configured to send an electrical test signal to the first and second wire-wound phases. The first and second wire-wound phases generate a response to the electrical test signal in the form of an electrical parameter that changes according to the temperature-responsive electrical resistance, and the controller is configured to identify the over-temperature condition based upon a difference in the electrical parameter between the first and second wire-wound phases.

In a further embodiment of any of the foregoing embodiments, the controller is configured to modify operation of the stator in response to the over-temperature condition by reducing current to the stator.

A stator according to an example of the present disclosure includes a plurality of wire-wound phases. The plurality of wire-wound phases include at least first and second wire-wound phases that differ in temperature-responsive electrical resistance.

In a further embodiment of any of the foregoing embodiments, the first wire-wound phase includes a conductive wire formed of a first material and the second wire-wound phase includes a conductive wire formed of a second material that differs in composition from the first material.

In a further embodiment of any of the foregoing embodiments, the first material and the second material are independently selected from the group consisting of allotropes of carbon, silver, copper, gold, aluminum, calcium, tungsten, zinc, nickel, lithium, iron, platinum, tin, and combinations thereof.

In a further embodiment of any of the foregoing embodiments, the first material includes copper and the second material excludes copper and includes at least one of allotropes of carbon, silver, gold, or aluminum.

In a further embodiment of any of the foregoing embodiments, the second wire-wound phase includes one or more wire bundles, and each of the one or more wire bundles includes the conductive wire formed of the second material.

In a further embodiment of any of the foregoing embodiments, the second wire-wound phase includes a plurality of wire bundles, and one of the wire bundles includes the conductive wire formed of the second material and another of the wire bundles includes a conductive wire formed of a third material that differs in composition from the second material.

In a further embodiment of any of the foregoing embodiments, the second wire-wound phase includes a plurality of wire bundles, and one of the wire bundles includes the conductive wire formed of the second material and another of the wire bundles includes a conductive wire formed of a third material having the same composition as the first material.

A method according to an example of the present disclosure includes a machine that has a rotor and a stator situated adjacent the rotor. The stator includes a plurality of wire-wound phases with at least first and second wire-wound phases that differ in temperature-responsive electrical resistance. An over-temperature condition of the stator is identified based upon the differing temperature-responsive electrical resistance of the first and second wire-wound phases, and operation of the stator is modified in response to the over-temperature condition.

In a further embodiment of any of the foregoing embodiments, the identifying of the over-temperature condition is based upon a difference in an electrical parameter between the first and second wire-wound phases that changes according to the temperature-responsive electrical resistance.

In a further embodiment of any of the foregoing embodiments, the modifying of the operation of the stator includes reducing current to the stator.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example of a machine that includes a stator with phases that differ in temperature-responsive electrical resistance.

FIG. 4 illustrates an example method for identifying an over-temperature condition.

FIG. 5 illustrates another example method for identifying an over-temperature condition.

DETAILED DESCRIPTION

Figure 2:
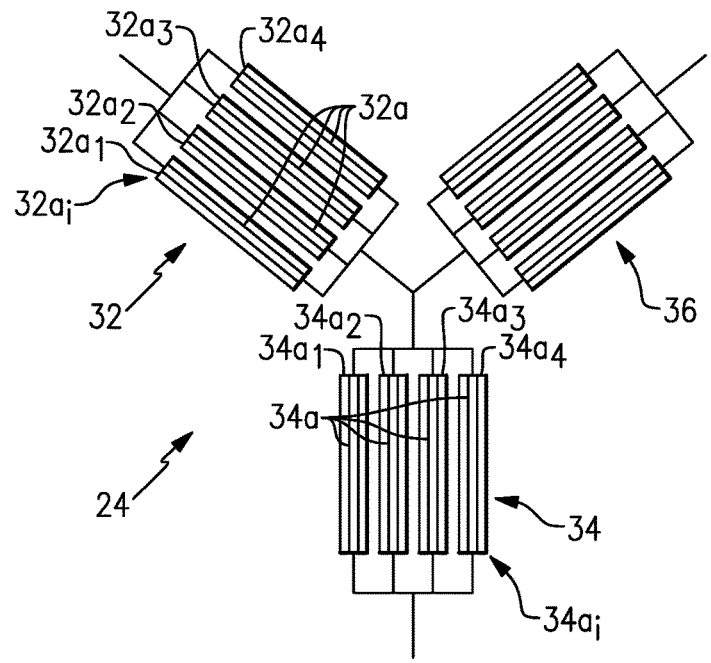
FIG. 2 illustrates an isolated view of selected portions of an example stator.

FIG. 1 illustrates a schematic representation of an example machine 20. For instance, the machine 20 can be, but is not limited to, an electric motor or an electric generator. As will be appreciated from the examples herein, this disclosure may also be applicable to other wire-wound rotary machines.

Generally, the machine 20 includes a rotor 22 and a stator 24 that is situated adjacent the rotor 22. The rotor 22 and stator 24 interact in a known manner to either produce mechanical output responsive to an electrical input (e.g., a motor) or produce electrical output responsive to a mechanical input (e.g., a generator), depending on the particular design. The rotor 22 may be coupled with a shaft 26 for mechanical input or output of the machine 20, and the rotor 22 and the stator 24 may be encased in a housing 28. As will be appreciated, the arrangement of the rotor 22 and the stator 24 is not limited to that shown and the examples herein may be applied to other machine configurations.

The stator 24 is in electrical communication with a controller 30, which serves to control operation of the machine 20 and regulate electric current of the stator 24. In this regard, the controller 30 can include software, hardware (e.g., a micro-processor), or both to carry out the functions described herein as well as other functions relating to the operation of the machine 20. Although the controller 30 is shown as a single unit, the controller 30 may alternatively be provided in multiple units or modules, which may or may not be commonly located.

FIG. 2 is an isolated view of the stator 24 in more detail than shown in FIG. 1. The stator 24 includes a plurality of wire-wound phases connected in a wye configuration. In this example, the stator 24 includes first, second, and third wire-wound phases, and each phase may include 4 parallel circuits, represented at 32, 34, and 36, respectively. Each phase includes of a plurality of poles (e.g. 2, 4, 6, 8, etc.). For purposes of this description, the wire-wound phases 32/34/36 are shown schematically and without a core around which the wires of the phases are wound. Although this example is based upon a three-phase design, this disclosure is also applicable to other multi-phase designs that have greater than one phase.

In this example, the second wire-wound phase 34 is different from both the first wire-wound phase 32 and the third wire-wound phase 36 in temperature-responsive electrical resistance. Electrical resistance changes as a function of temperature. The electric resistance of the second wire-wound phase 34 changes as a function of temperature at a different rate than the electrical resistance of the first or third wire-wound phase 32/36 changes as a function of temperature. In this regard, the controller 30 is configured to utilize this difference in temperature-responsive electrical resistance in order to identify an over-temperature condition of the stator 24 and responsively change the operation of the stator 24.

For example, because of the difference in the temperature-responsive electrical resistance, the first and second wire-wound phases 32/34 produce a difference in electrical response as a function of temperature, which can be detected in the form of an electrical parameter. If the difference exceeds a predefined limit, the controller 30 identifies this an over-temperature condition. For instance, a difference of X that is below the predefined limit is indicative of a relatively low, acceptable temperature. However, a difference of Y that is above the predefined limit is indicative of a relatively high, "unacceptable" temperature.

An "unacceptable" temperature may be either a temperature limit above which there is a potential for degradation or other damage to the stator 24 (e.g., thermal decomposition of wire insulation) or a caution temperature that approaches the temperature limit. The controller may use a caution temperature that approaches the temperature limit to actively reduce the temperature before there is the potential for degradation or other damage to the stator 24. The difference in electrical parameter can also be mapped as a function of temperature to facilitate selection of acceptable and unacceptable temperature limits with regard to the particular machine design.

An over-temperature condition can potentially damage the stator 24 or other components of the machine 20. By identifying the over-temperature condition, the controller 30 can take measures to mitigate the potential for thermal damage and thus potentially enhance machine durability. For example, in response to an identified over-temperature condition, the controller 30 modifies the operation of the stator 24 to reduce temperature. Example modifications that reduce temperature can include, but are not limited to, reducing electric current input into the stator 24 to a non-zero amount or completely shutting-off the current input.

The difference in temperature-responsive electrical resistance between the second wire-wound phase 34 and either of the first or third wire-wound phase 32/36 is achieved by using conductive wires of different materials for the phases 34 and 32/36. For example, the first wire-wound phase 32 includes a conductive wire 32a that is formed of a first material and the second wire-wound phase 34 includes a conductive wire 34a that is formed of a second material that differs in composition from the first material. The electrical resistivities of the different materials change at different rates with change in temperature. Thus, the electrical response of the second wire-wound phase 34 differs from the electrical response of the first wire-wound phase 32 (and/or the third wire-wound phase 36) as a function of temperature. The controller 30 uses this difference in electrical response, in the form of an electrical parameter such as voltage, resistance, or current, to identify the over-temperature condition.

The first and second materials of the conductive wires 32a/34a can be independently selected from allotropes of carbon, silver, copper, gold, aluminum, calcium, tungsten, zinc, nickel, lithium, iron, platinum, tin, and combinations thereof. Allotropes of carbon can include graphite and graphene, for example. In this disclosure, reference to an element refers to the pure or substantially pure element and also alloys based on the element where the element is the primary constituent.

Although the first and second materials have different electrical resistivities, some materials have better conductivity than others and selection may depend also on the requirements of a particular application. However, in further examples, the first and second materials are selected from among the materials that have higher electrical conductivity, such as allotropes of carbon, silver, copper, gold, and aluminum.

Each material also has a temperature coefficient of resistivity (hereafter "coefficient"), which represents the amount that the electrical resistance of the material changes per unit change in temperature (see Table I below). Relatively larger differences in the coefficients between the first and second materials produces larger differences in electrical response at a given temperature. Selecting two materials that have a relatively large difference in coefficients may therefore facilitate detection of the difference in the electrical response. Therefore, the two materials can be selected with regard to the particular sensing capability of the hardware and/or software of the controller 30.

TABLE I

Electrical Resistivity and Temperature Coefficient

| Material | σ (S/m) at 20° C. | Temperature coefficient (K$^{-1}$) |
|---|---|---|
| Carbon (graphene) | $1.00 \times 10^8$ | −0.0002 |
| Silver | $6.30 \times 10^7$ | 0.0038 |
| Copper | $5.96 \times 10^7$ | 0.003862 |
| Annealed copper | $5.80 \times 10^7$ | 0.00393 |
| Gold | $4.10 \times 10^7$ | 0.0034 |
| Aluminium | $3.50 \times 10^7$ | 0.0039 |
| Calcium | $2.98 \times 10^7$ | 0.0041 |
| Tungsten | $1.79 \times 10^7$ | 0.0045 |
| Zinc | $1.69 \times 10^7$ | 0.0037 |
| Nickel | $1.43 \times 10^7$ | 0.006 |
| Lithium | $1.08 \times 10^7$ | 0.006 |
| Iron | $1.00 \times 10^7$ | 0.005 |
| Platinum | $9.43 \times 10^6$ | 0.00392 |
| Tin | $9.17 \times 10^6$ | 0.0045 |

Additionally, each of the wire-wound phases 32/34/36 includes a corresponding plurality of wire bundles. For example, the first wire-wound phases 32 includes wire bundles $32a_1$, $32a_2$, $32a_3$, and $32a_4$, which are collectively represented at $32a_i$. The second wire-wound phase 34 includes parallel circuit wire bundles $34a_1$, $34a_2$, $34a_3$, and $34a_4$, which are collectively represented at $34a_i$. In this example, parallel circuit wire bundles $32a_i$ and $34a_i$ of the first and second wire-wound phases 32 and 34 are connected in a wye configuration in the respective phase 32 or 34. All of the conductive wires 32a of the wire bundles $32a_i$ of the first wire-wound phase 32 are formed of the first material. Similarly, all of the conductive wires 34a of the wire bundles $34a_i$ of the second wire-wound phase 34 are formed of the second material. In further examples, the conductive wires 32a are formed of copper, and the conductive wires 34a are formed of allotropes of carbon, silver, gold, or aluminum to provide good conductivity. The conductive wires of the third wire-wound phase 36 may also be formed of copper.

Figure 3:
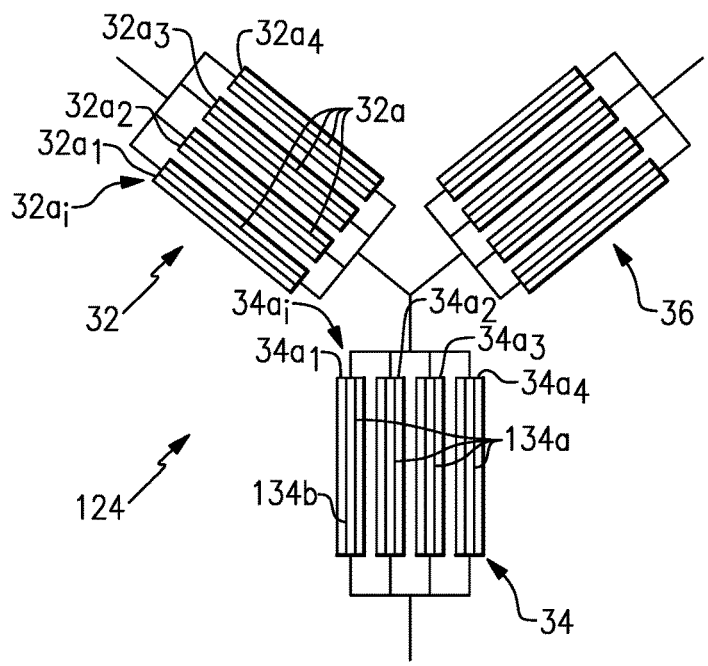
FIG. 3 illustrates an isolated view of selected portions of another example stator.

FIG. 3 illustrates another example stator 124 that is similar to the stator 24. In this disclosure, like reference numerals designate like elements where appropriate and reference numerals with the addition of one-hundred or multiples thereof designate modified elements that are understood to incorporate the same features and benefits of the corresponding elements. In this example, rather than the conductive wires of all of the wire bundles $34a_i$ being formed of the second material, only conductive wires 134b of wire bundle $34a_1$ are formed of the second material. The conductive wires 134a of wire bundles $34a_2$, $34a_3$, and $34a_4$ are formed of a third material that differs in composition from the second material. For example, the third material has the same composition as the first material of the conductive wires 32a of the first wire-wound phase 32. Thus, all of the conductive wires in the stator 124 may be formed of the composition of the first material with the exception of the conductive wires 134b of the wire bundle $34a_1$. In further examples, at least one additional one of the wire bundles $34a_2$, $34a_3$, and $34a_4$ is also formed of conductive wires of the second material. That is, fewer than all of the wire bundles wire bundles $34a_1$, $34a_2$, $34a_3$, and $34a_4$ are formed with conductive wires of the second material.

FIG. 4 illustrates an example control method 40 of the controller 30. In this example, the controller 30 senses, or detects, an electrical parameter of the wire-wound phases 32/34/36. The electrical parameter can be, but is not limited to, voltage, current, resistance, or other parameter that is calculated from voltage, current, or resistance. In this example, the voltage, current, or resistance is the functional voltage, current, or resistance of the stator 24/124 during operation of the machine 20.

The detection may be conducted using an electrical device or circuit in the controller 30 or a remotely located electrical device or circuit that is in communication with the controller 30. The controller 30 compares the electrical parameter to determine whether the electrical parameter is balanced. For example, if the voltages and/or currents are balanced, the controller 30 returns to the sensing step for another iteration of sensing the electrical parameter. If the electrical parameter is not balanced, the controller 30 triggers a phase unbalance fault, which represents the over-temperature condition. In one example, the imbalance is determined based upon the aforementioned predefined limit. If the difference in electrical parameter exceeds the limit, the controller 30 triggers the phase unbalance fault.

In response to the phase unbalance fault (i.e., over-temperature condition), the controller 30 modifies operation of the stator 24/124. For example, the controller 30 reduces current, voltage, or excitation frequency of the stator 24/124 to reduce temperature. After a predetermined amount of time and/or return to a balanced state upon another iteration of the method 40, the controller 30 may resume operation of the stator 24/124 by increasing current or voltage.

Additionally or alternatively, the controller 30 can be configured with control method 50 as illustrated in FIG. 5, which utilizes an electrical test signal to identify the over-temperature condition. In this example, the controller 30 sends the electrical test signal in the form of a low power sense phase current to the stator 24/124 and detects the responsive electrical parameter of the phases 32/34. For instance, the controller 30 measures or detects voltage of the phases 32/34, calculates resistance of the phases 32/34, and then determines whether the phase resistance is balanced (e.g., whether the difference exceeds the predefined limit). If the phase resistance is balanced, the controller 30 continues operation of the machine 20. If the phase resistance is not balanced, the controller 30 triggers a phase unbalance fault and, in response, modifies operation of the stator 24/124. After a predetermined amount of time and/or return to a balanced state upon another iteration of the method 50, the controller 30 may resume operation of the stator 24/124 by increasing current or voltage.

By utilizing the difference in temperature-responsive electrical resistance between the first and second wire-wound phases 32/34, the controller 30 can identify an over-temperature condition and modify operation of the stator 24/124 accordingly to reduce temperature. Thus, the machine 20 does not require additional sensors or other hardware, such as thermocouples, embedded in the stator 24/124 in order to identify an over-temperature condition. Moreover, to the extent that an existing controller can be reprogrammed, an existing machine can be retrofit with the stator 24/124 and reprogrammed with the functionality to identify the over-temperature condition.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A machine comprising:
   a rotor;
   a stator situated adjacent the rotor, the stator including a plurality of wire-wound phases, the plurality of wire-wound phases including at least first and second wire-wound phases that differ in temperature-responsive electrical resistance; and
   a controller in electrical communication with the plurality of wire-wound phases, the controller configured to:
   identify an over-temperature condition of the stator based upon the differing temperature-responsive electrical resistance of the first and second wire-wound phases, and
   modify operation of the stator in response to the over-temperature condition.

2. The machine as recited in claim 1, wherein the first wire-wound phase includes a conductive wire formed of a first material and the second wire-wound phase includes a conductive wire formed of a second material that differs in composition from the first material.

3. The machine as recited in claim 2, wherein the first material and the second material are independently selected from the group consisting of allotropes of carbon, silver, copper, gold, aluminum, calcium, tungsten, zinc, nickel, lithium, iron, platinum, tin, and combinations thereof.

4. The machine as recited in claim 2, wherein the first material includes copper and the second material excludes copper and includes at least one of allotropes of carbon, silver, gold, or aluminum.

5. The machine as recited in claim 2, wherein the second wire-wound phase includes one or more wire bundles, and each of the one or more wire bundles includes the conductive wire formed of the second material.

6. The machine as recited in claim 2, wherein the second wire-wound phase includes a plurality of wire bundles, and one of the wire bundles includes the conductive wire formed of the second material and another of the wire bundles includes a conductive wire formed of a third material that differs in composition from the second material.

7. The machine as recited in claim 2, wherein the second wire-wound phase includes a plurality of wire bundles, and one of the wire bundles includes the conductive wire formed of the second material and another of the wire bundles includes a conductive wire formed of a third material having the same composition as the first material.

8. The machine as recited in claim 1, wherein the controller is configured to identify the over-temperature condition based upon a difference in an electrical parameter between the first and second wire-wound phases that changes according to the temperature-responsive electrical resistance of the first and second wire-wound phases.

9. The machine as recited in claim 1, wherein the controller is configured to send an electrical test signal to the first and second wire-wound phases, the first and second wire-wound phases generating a response to the electrical test signal in the form of an electrical parameter that changes according to the temperature-responsive electrical resistance, and the controller is configured to identify the over-temperature condition based upon a difference in the electrical parameter between the first and second wire-wound phases.

10. The machine as recited in claim 1, wherein the controller is configured to modify operation of the stator in response to the over-temperature condition by reducing current to the stator.

11. The machine as recited in claim 1, wherein each of the plurality of wire-wound phases includes a plurality of wire bundles connected in parallel.

12. A method comprising:
   in a machine that has a rotor and a stator situated adjacent the rotor, wherein the stator includes a plurality of wire-wound phases with at least first and second wire-wound phases that differ in temperature-responsive electrical resistance,
   identifying an over-temperature condition of the stator based upon the differing temperature-responsive electrical resistance of the first and second wire-wound phases; and
   modifying operation of the stator in response to the over-temperature condition.

13. The method as recited in claim 12, wherein the identifying of the over-temperature condition is based upon a difference in an electrical parameter between the first and second wire-wound phases that changes according to the temperature-responsive electrical resistance.

14. The method as recited in claim 12, wherein the modifying of the operation of the stator includes reducing current to the stator.

* * * * *